G. W. MANUEL.
Gang Plow.
No. 78,111.
2 Sheets—Sheet 1.
Patented May 19, 1868.
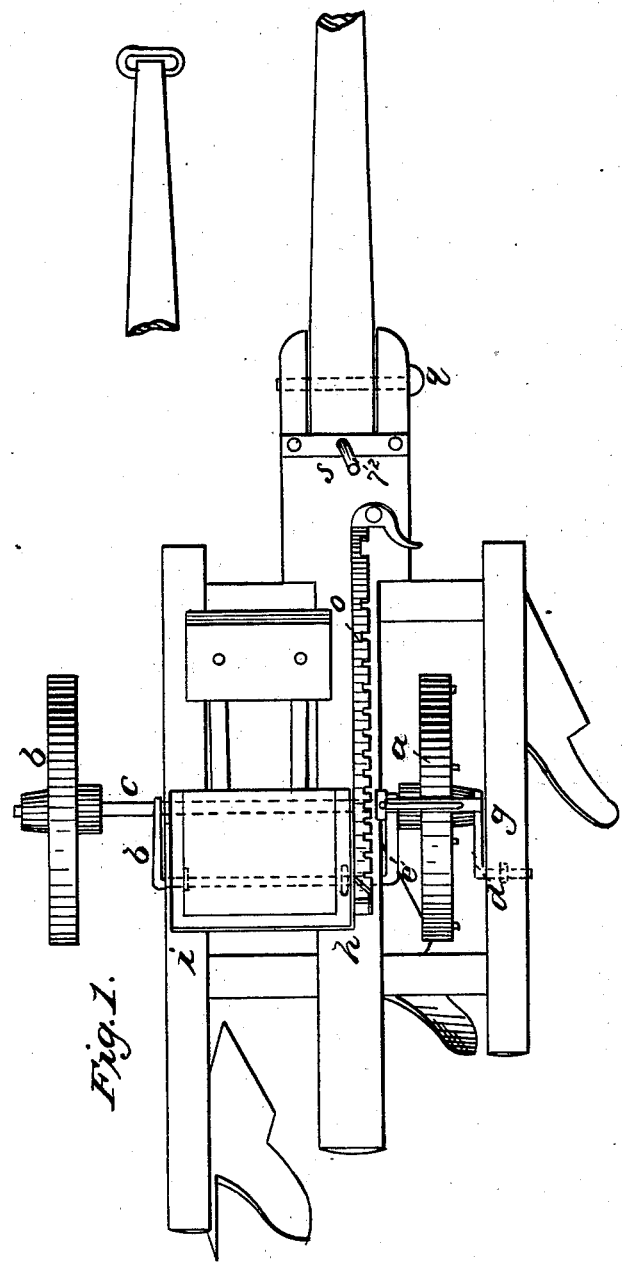

G. W. MANUEL.
Gang Plow.
No. 78,111.
2 Sheets—Sheet 2.
Patented May 19, 1868.
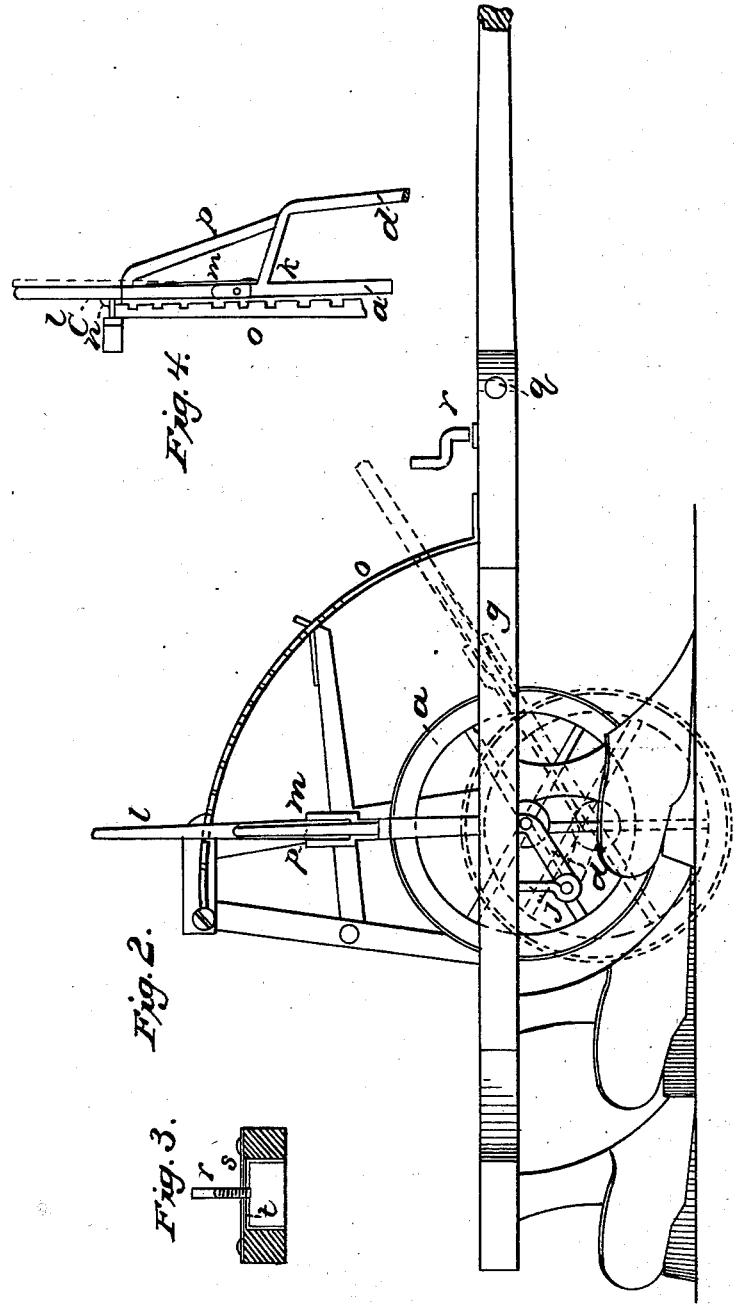

United States Patent Office.

GEORGE W. MANUEL, OF SAN FRANCISCO, CALIFORNIA.

*Letters Patent No. 78,111, dated May 19, 1868.*

IMPROVEMENT IN GANG-PLOUGHS.

*The Schedule referred to in these Letters Patent and making part of the same.*

TO ALL WHOM IT MAY CONCERN:

Be it known that I, GEORGE W. MANUEL, of San Francisco, in the State of California, have invented a certain new and useful Improvement on Gang-Ploughs; and I do hereby declare that the following is a full, clear, and exact description thereof, reference being had to the accompanying drawings, and to the letters and marks thereon, which said drawings form part of this specification, and by the several figures thereof represent a plough, and in detail some of its parts, constructed under my invention—

Figure 1 being a top view of the plough.

Figure 2, a side view.

Figure 3, a view, by section, of the tongue, bars, and the means for raising and lowering the tongue; and Figure 4 a view of the lever and toothed bar.

In each of these figures, where like parts are shown, like marks and letters are used to indicate the parts.

Both of the wheels, $a$ and $b$, of this plough are of the same diameter, and, in use, both will travel on the unbroken soil. The axle $c$ is connected to crank-arms $d\ e\ f$; the crank-arms being directly under the hounds or bars $g\ h\ i$ of the frame, and attached thereto by bars or rods $j$. The crank-arms $d$ and $e$ extend upward, the one on the one side and the other on the other side of the hub of the wheel $a$. At $k$, the two crank-arms become united, and form a bearing for the lever $l$, which, at its lower end, is there pivoted, (see fig. 4.)

A spring, $m$, acts to keep the tooth $n$ of the lever in the recesses of the curved bar $o$, and a rod, $p$, serves to guide and support the lever. The lower end of this rod plays in a hole in the arm $d$, while its upper end is affixed to the lever $l$. By this lever $l$, and the means connected therewith, as here recited, the frame and ploughs attached thereto are raised and lowered and adjusted, so that the ploughs may enter the soil deeper or shallower, or be raised entirely up from the ground, as is indicated by the position of the lever and wheels in the red lines of fig. 2.

A plough is affixed to each of the bars $g\ h\ i$; that on the bar $g$, it will be noticed, is outside of the wheel $a$, and in front of the line of the axle, while the other two are behind the axle. This arrangement and position of the ploughs allows of the use of this gang-plough to strike out and finish up the land without the aid of the single plough, and also to plough close up to a fence, stump, or stone. This arrangement further allows of the ploughs being so placed in relation to each other that the front one acts to a certain extent as a balance to the rear one, and yet the three being near the centre of the machine.

Fig. 3 shows the means for raising or lowering the tongue to give the plough draught, as is required at times when the ground is hard, or when the point of the plough is dull.

The pivoting-bolt of the tongue is at $q$, fig. 2, and the crank-screw at $r$ in the same figure, and in fig. 3. This crank-screw passes through the plate $s$ and into a plate, $t$, attached to the tongue, there being screw-threads in the plate $s$. By turning the crank-screw in one direction or the other, the end of the tongue will be raised or lowered, as may be required. Instead of the screw-threads being in the plate $s$, they may be in the plate $t$, or in a screw-nut affixed in the tongue, and the crank-screw be shouldered to the plate $s$.

Both of the wheels of this plough running on the solid ground, instead of one running in the furrow, the plough will be of lighter draught than if made as gang-ploughs usually are; and both wheels being of the same diameter, when the ploughs are elevated, this gang-plough can be drawn about as easily and conveniently as a cart.

Having thus set forth my invention, what I claim as new, and desire to secure by Letters Patent, is—

1. The arrangement of the crank-arms $d\ e\ f$, under the hounds or bars, and in their relation thereto, as and for the purposes set forth.

2. In a gang-plough, having a series of ploughs arranged on bars or hounds parallel to each other, I claim placing the one plough on the bar $g$, outside of the wheel $a$, and in front of the axle, as and for the purposes recited.

3. The combination of the extended crank-arms $d$ and $e$ with the lever $l$ and curved bar $o$, as and for the purposes herein set forth.

4. The crank-screw $r$ and plates $s$ and $t$, for elevating and depressing the tongue, as described.

This specification signed, this 4th day of February, 1868.

GEO. W. MANUEL.

Witnesses:
N. W. SPAULDING,
WM. HERMANS.